No. 677,955. Patented July 9, 1901.
L. G. CUNNINGHAM.
GALVANIC BATTERY.
(Application filed Mar. 8, 1901.)
(No Model.)
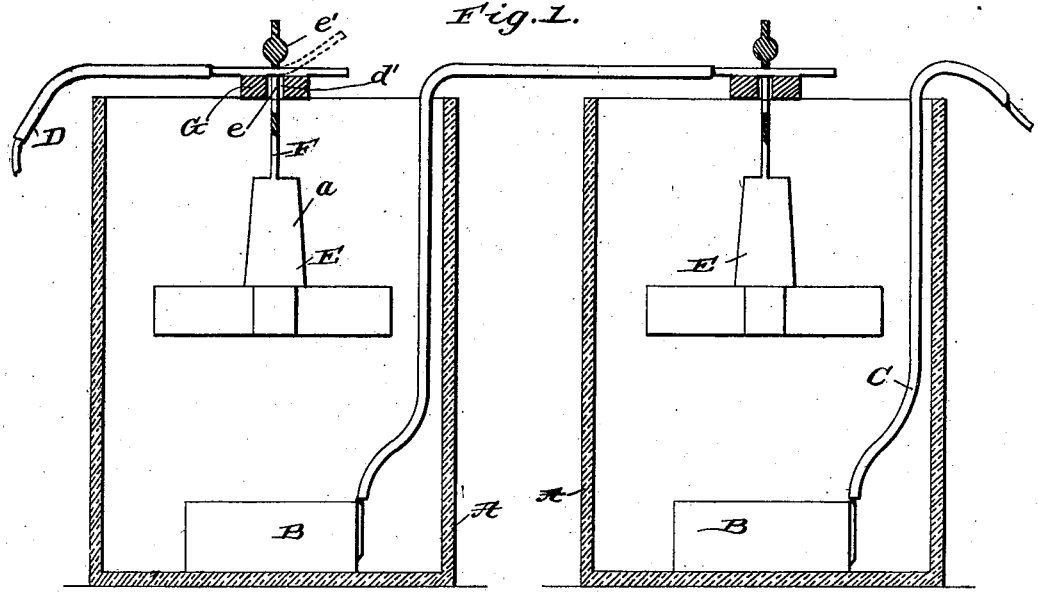
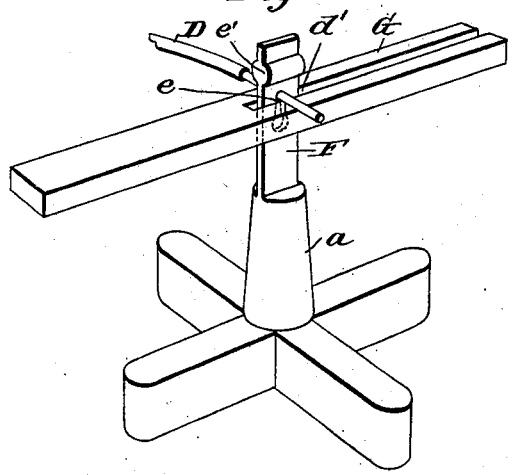

UNITED STATES PATENT OFFICE.

LEVI G. CUNNINGHAM, OF SHELLROCK, IOWA.

GALVANIC BATTERY.

SPECIFICATION forming part of Letters Patent No. 677,955, dated July 9, 1901.

Application filed March 8, 1901. Serial No. 50,284. (No model.)

*To all whom it may concern:*

Be it known that I, LEVI G. CUNNINGHAM, a citizen of the United States, residing at Shellrock, in the county of Butler and State of Iowa, have invented new and useful Improvements in Galvanic Batteries, of which the following is a specification.

My invention relates to galvanic batteries, and more particularly to means employed for effecting electrical connection between one of the elements of a cell and a line-wire or a conductor leading to the opposite element of another cell.

It consists in a construction whereby one of the elements, preferably the zinc or attacked element of a cell, may be suspended in the cell and expeditiously and securely connected in an electrical manner to a line-wire or to a conductor leading to the opposite element of another cell, and this without the employment of binding-screws or similar devices, which contribute materially to the cost of a battery and increase the labor of the person whose business it is to attend to the same.

With the foregoing in mind the invention will be fully understood from the following description and claims when taken in connection with the accompanying drawings, in which—

Figure 1 is a sectional view of a battery comprising two cells and embodying my improvements. Fig. 2 is a perspective view illustrating the manner in which one of the zinc elements is suspended in a cell and electrically connected to a line-wire or to a conductor leading to the opposite element of another cell.

Referring by letter to the said drawings, A A are cells of a galvanic battery. B B are copper elements arranged therein and connected to conductors C. D is a line-wire, and E E are the zinc or attacked elements. The zinc elements are preferably cruciform, although they may be of any other suitable configuration, and as they are similar in construction a description of the one shown in Fig. 2 will suffice to impart an understanding of both. By reference to the said figure it will be observed that the zinc element is provided with an upwardly-extending central portion $a$, in which is cast or otherwise secured a stem F, of copper or other suitable material. The stem F is designed to extend through an aperture or bifurcation $d$ in a bridge-bar G, of wood or other material, arranged across the top of a cell, and is provided with an elongated aperture or slot $e$, which is gradually contracted or reduced in width toward its upper end, as shown, and is also provided above the said aperture $e$ with a swell or enlargement $e'$, larger in size than the width of the bifurcation $d$, as shown. The aperture $e$ is designed to receive either a conductor leading to the copper element of another cell or a line-wire, and when desired the end of the conductor or line-wire may be bent upwardly, as illustrated by broken lines at the left of Fig. 1, with a view of rendering the connection more secure. When the conductor is removed from the aperture $e$ of stem F to permit of the battery being cleaned, the swell or enlargement $e'$ on said stem will bear on the bridge-bar G and hold the zinc element thereto. Then when the conductor is to be replaced in the aperture $e$ the attendant has but to raise the zinc element until the upper portion of the said aperture is in a plane above the bridge-bar.

In assembling the parts of my improvements the zinc elements are held in the cells and the bridge-bars are placed across the tops of the cells in an endwise manner and so that their apertures or bifurcations $d$ receive the stems F of the elements E. A conductor C is then passed through the aperture $e$ of one stem above the bridge-bar, and a line-wire D is similarly passed through the aperture $e$ of the stem on the other zinc element above the adjacent bridge-bar. With this done it will be observed that the weight of the zinc elements will be imposed on the portions of the wires in the slots $e$ of the stems F, and consequently the said portions of the wires will be tightly held in the upper portion of the slots, with the result that a sure electrical connection will be effected between the stems and the wires. Moreover, it will be observed that the weight of the zinc elements will tend to bind the wires on the upper sides of the bridge-bars, and thereby securely hold the same against casual removal from the apertures or slots $e$. This really renders it unnecessary to bend the ends of the wires upwardly, as illustrated by broken lines at the left of Fig.

1, although I prefer, for the sake of safety, to so bend the wires. When the wires are intentionally removed from the apertures e of the stems, the enlargements or swells on the stems will bear on the bridge-bars, with the result that the zinc elements will hang from said bridge-bars.

I prefer to have the apertures e elongated and contracted to a point at their upper ends, because in that event the wires are crowded into the upper reduced portions of the apertures by the weight of the elements E, and an electrical connection between the stems and wires is insured. I do not desire, however, to be understood as confining myself to the employment of slots or elongated apertures, as when desired apertures of circular or other form may be employed.

It will be appreciated from the foregoing that by virtue of my improvements I am able to expeditiously effect electrical connection between one of the elements of a cell and a line-wire or a conductor leading to the opposite element of another cell and also that the connection is safe and is very inexpensive, because it does not entail the employment of binding-screws or analogous devices, which contribute materially to the expense of a battery and greatly increase the work of a battery attendant.

It will be further appreciated from the foregoing that the zinc elements are electrically connected to the conductors and are suspended in the cells simply by reason of the described arrangement of their stems and the conductors with respect to each other and the bridges or bridge-bars.

Having described my invention, what I claim, and desire to secure by Letters Patent, is—

1. The combination of a battery-cell, a bridge thereon having a vertically-disposed opening, an element having a stem extending upwardly through the opening of the bridge, and provided with a vertically-elongated aperture contracted toward its upper end, and a conductor extending through the aperture in the element stem and resting on the bridge.

2. The combination of a battery-cell, a bifurcated bridge thereon, an element having a stem resting in the bifurcation of the bridge and provided with an aperture, and an enlargement arranged above said aperture, and a conductor extending through the aperture in the element stem, and resting on the bridge.

In testimony whereof I have hereunto set my hand in presence of two subscribing witnesses.

LEVI G. CUNNINGHAM.

Witnesses:
W. H. McGREGOR,
J. A. BOWEN.